May 7, 1957 H. C. PYE 2,791,641

TELEPHONE RECEIVER

Filed Aug. 19, 1955 2 Sheets-Sheet 1

*INVENTOR.*
HAROLD C. PYE
*BY* Mc Walter Owen,
ATTY.

May 7, 1957

H. C. PYE 2,791,641

TELEPHONE RECEIVER

Filed Aug. 19, 1955

2 Sheets-Sheet 2

*INVENTOR.*

HAROLD C. PYE

*BY* Mc Walter Owen

ATTY.

United States Patent Office 2,791,641

Patented May 7, 1957

2,791,641

TELEPHONE RECEIVER

Harold C. Pye, Oak Park, Ill., assignor to General Telephone Laboratories, Incorporated, a corporation of Delaware Application August 19, 1955, Serial No. 529,435

9 Claims. (Cl. 179—114)

Figure 1:
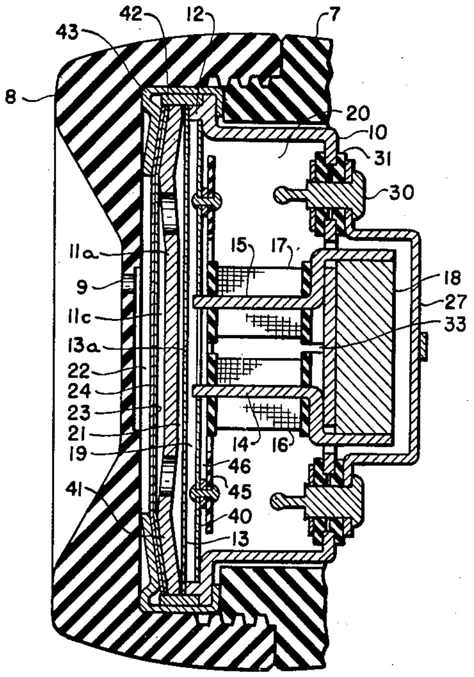

The present invention relates to sound translating devices and more particularly to improvements in telephone receivers of the permanent magnet type for obtaining increased intelligibility of the transmitted speech.

Earlier receivers had a frequency response characteristic that was very much peaked in about the middle of the voice band. As time went on, improvements were made in the receiver whereby the peaked response at the center of the band was decreased, and the response at both ends of the band was raised. This action gave a much more natural sounding voice, and eliminated the ringing sound of the old receivers, which was due to shock excitation of the diaphragm causing it to resonate.

Further research showed that an extended range of response at the high frequency end of the band would not only reproduce a more natural sounding voice, but also increase the intelligibility of the spoken voice, thereby markedly improving articulation, even when used in locations having high ambient noise.

The effort to extend the higher frequency response of the telephone receivers has, however, been retarded because the outside plant, where heavily loaded and long lines seriously attenuate the higher frequencies, made it a waste of effort to have a receiver with a useable response above about 3000 cycles. Such frequencies could rarely be received from the transmitting telephone and any such frequency that was received would be transient line noise that was picked up. The growth of urban communities with their concentrated telephone plants, and improvements in transmission facilities such as the use of voice amplifiers has now made it desirable to use such a receiver.

Accordingly an object of the invention is to provide an improved sound translating device which has a more natural sounding response.

Another object of the invention is to provide a receiver with an increased sensitivity and greater stability of operating properties and with an improved response over a higher range of frequencies.

Another object of the invention is to provide a receiver with a means for protecting the interior against the entry of dust and moisture.

A further object of the invention is to provide a receiver which is of extremely simple and rugged construction, which is compact and economical to manufacture, and which is efficient in operation.

These objects are realized through the cooperative functioning of some or all of the following features incorporated in this invention.

The first of these features is a front resonating chamber so constructed and dimensioned that its resonant frequency is approximately 3200 cycles per second, and a damping means within the front chamber for decreasing and flattening the peak amplitude of response due to this resonance.

Another feature is the inclusion of a magnetically permeable bridge located next to the diaphragm, but on the side opposite to that facing the pole pieces for increasing the magnetic field in which the diaphragm operates without magnetically saturating it, thus increasing its sensitivity.

Another feature is the thin plastic membrane over the front of the receiver which provides an effective moisture and dust resistant seal.

Still another feature is the minute hole in the diaphragm which effectively prevents the diaphragm sticking by permitting the equalization of air pressure on both of its sides.

In general the objects as set forth above are attained in accordance with the present invention by providing a sound translating device which is an improvement of the structure disclosed in Patent 2,205,670 issued to Harold C. Pye on June 25, 1940.

Structures of the type disclosed therein provide a reasonably faithful reproduction of the human voice over a limited frequency range with a sensitivity that is variable with frequency. The sensitivity being greatest in a range of frequencies approaching the natural frequency of the diaphragm.

Present day magnetic capsule type receivers still consist basically of a magnetic diaphragm excited in response to the fluctuations in the magnetic field of an electromagnet.

As is well known, a metal disc type of diaphragm, when rigidly mounted at its periphery will, when excited, vibrate with great amplitude at some frequency determined by the diameter, cross-section and elasticity of the disc. This frequency is called its resonant frequency. For a given diameter and elasticity, an increase in the cross-section causes an increase in this frequency, and were it not for the fact that a diaphragm with a large cross-section is less sensitive to weak signals at frequencies other than resonance, diaphragms would be selected of a weight such that their resonantly peaked output would be near the desired upper frequency limit. At present the diaphragms are so selected that their resonant frequency is at approximately the center of the range of frequencies that are to be utilized for transmission. This brings their harmonic frequencies outside of the band utilized for voice transmission.

If a diaphragm were to be selected with a frequency of resonance such that a harmonic is near the maximum frequency to which it is expected to respond, the inherent lightness would make it more sensitive to all vibrations, and it would also be possible to utilize the improved output due to this harmonic. The output due to the vibrations of the diaphragm at the resonant and harmonic frequencies is quite peaked at these frequencies. If no damping was to be provided to flatten this peaked response, there would be a tendency, when once excited, of maintaining its natural rate of vibration for a longer or shorter interval of time. The other incoming frequencies would then be masked in the fading sound of the resonant frequencies, so that proper reception would become difficult. Further, the extremely loud sounds at these peaks would tend to desensitize the ear to the extent that it could not hear weaker sounds even though they are perfectly audible to an ear not so desensitized. Too great a damping would, of course, overcome the advantages of the reinforced response. Because of space and other considerations, destructive damping is resorted to in the present design for the flattening of these resonant peaks. This is accomplished by providing a chamber between the diaphragm and a plate with restricted paths for the passage of air through it to a chamber between this plate and the housing. The damping is achieved through the consumption of energy when the air is forced through the restricted passages from the chamber adjacent the diaphragm through the damping plates restricted passages to the chamber between the damping plate and housing. The degree of damping is controlled by the size of the chamber adjacent the diaphragm and the dimension of the restricted passages. The more violently the air is forced to move through the passages, the greater is the degree of damping.

With the resonant peaks flattened out, there still remains a valley in the response curve of the receiver between the flattened though still resonantly enhanced portion and the output at the higher limit due to the harmonic of the main resonant frequency. To augment the response in this portion of the curve a closely coupled resonant chamber in front of the diaphragm is used. This chamber is bound by the diaphragm on the one side and by the earcap on the other. It is tuned by its volume and dimensions to a frequency corresponding approximately to the frequency at the center of the valley. But as with the enhanced response due to the resonance of the diaphragm, the response due to the resonance of this chamber is also rather sharply peaked and must be flattened. For this purpose a specially selected cloth is inserted into the front chamber. This cloth which is stretched across the approximate center of the chamber divides the chamber into two portions which communicate through the cloth.

In view of the critical weight of the diaphragm and the close tolerances used in the manufacture of this instrument, dust particles or moisture could have a deleterious effect upon its performance. Therefore, to prevent these from reaching the interior, a plastic membrane is stretched across the front of the receiver capsule just over the cloth damping member. This membrane is of such low mass that it does not have any noticeable effect upon the response while providing a very effective moisture and dust barrier. The cloth damping member and the plastic membrane are held in place between the face plate and the clamping ring.

In a completely sealed unit where the acoustic chambers behind the diaphragm are also sealed, there is occasionally encountered a condition where the atmospheric pressure is greater than the pressure of the gasses within the chamber. When such a condition is encountered, the diaphragm may be pressed against the pole pieces causing the receiver to become inoperative. Or should the atmospheric pressure be decreased much below the pressure of the gases in the chambers, the diaphragm may be moved away from the pole pieces to the extent that the output of the receiver would be seriously impaired. To overcome these disadvantages, and still retain the advantages of the acoustic chambers and of a unit sealed against the entry of dust and moisture, it became necessary to equalize the pressures on both sides of the diaphragm. To do this without interfering with the dimensionally sensitive chambers required that the passage between the two sides of the diaphragm be of a very high resistance acoustically. This, however, presented no serious problem since the ambient atmospheric pressure of a telephone changes rather slowly and even a high resistance equalizing path would prove adequate. Such a path was provided by drilling a 0.029 inch passage through the center of the diaphragm.

Figure 3:
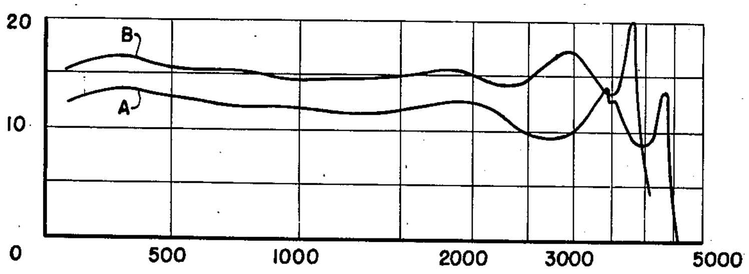

The output curve of a receiver constructed in the manner described is shown by curve A of Fig. 3. With its extended frequency response to practically 5000 cycles it is capable of providing considerably improved articulation over previously available receivers. Its response characteristics and degree of sensitivity also give it a decided advantage over more sensitive receivers when used in noisy locations with short lines such as found in ship service telephone installations and in industrial locations.

However, for service in telephones for use over longer lines, a more sensitive receiver is desirable. To improve the sensitivity of this receiver requires a magnetic field of increased strength in which to operate the diaphragm. This could be accomplished by increasing the strength of the permanent magnet, or by bringing the diaphragm closer to the pole pieces. However it is not possible to increase the size of the magnet without encountering other serious problems and unless the diaphragm is made stiffer, it may be pulled towards, and rest against, the pole pieces. Frequency characteristics prevent mechanical stiffening of the diaphragm, therefore if the advantages of a strong field and light weight diaphragm were to be realized, some means had to be found to increase the field strength without resorting to either of these methods. The method devised for increasing the sensitivity of the receiver consisted of placing a magnetically permeable shunt plate opposite the pole pieces but on the other side of the diaphragm. This plate presents a lower reluctance path to the magnetic lines of force, thus changing the stray pattern and concentrating them so that more of them pass through the diaphragm. The strength of the magnetic field in which the diaphragm operates is thus increased, without increasing the size of the permanent magnet or bringing the diaphragm closer to the pole pieces. This magnetic shunt plate also contributes a balancing effect upon the force acting upon the diaphragm, with consequences that it is a major fact contributing to an increase in output of about 3 db throughout the entire useable range. Line B on the graph of Fig. 3 is the result of this modification.

Figure 2:
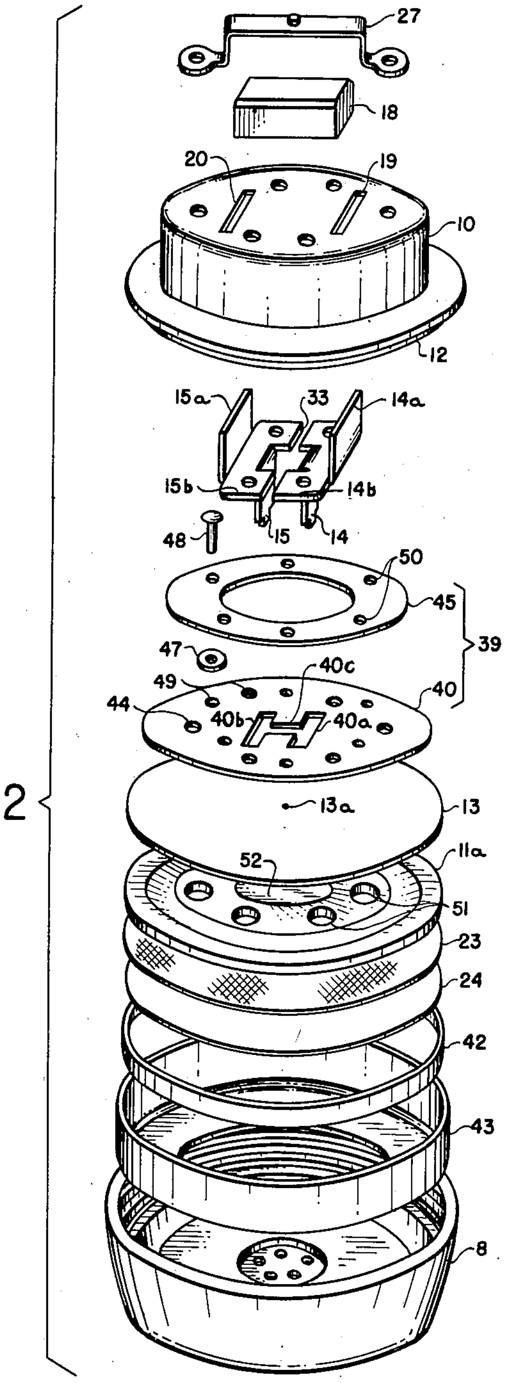
Figure 2A:
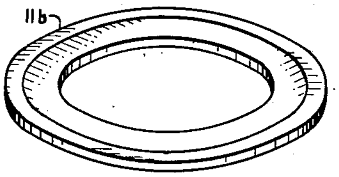

Referring now more particularly to the drawings, there is illustrated in Fig. 1 a section of a sound translating device in the form of a telephone receiver of the cell type mounted within the cup-shaped portion 7 of a hand set handle, while Fig. 2 is an exploded view showing the component parts. The cell is supported between the rim of the cup-shaped opening and the inner wall of a cup-shaped ear piece 8 which is adapted to be screwed on the threaded portion of the cup 7. The ear piece is provided with transmission holes 9 in the bottom wall thereof, the present embodiment utilizing 5 such holes. The receiver cell comprises a cup-shaped housing 10 having mounted thereon the magnetic field structure of the device. The rim of the housing 10 is provided with a bent-over flanged portion having formed integrally therewith an annular ring 12 forming a bearing surface for the receiver diaphragm 13 constructed of magnetic material, and having a passage **13*a* through its center. The edge of the diaphragm 13 is clamped between this bearing surface 12 and a face plate 11*a* used in the one embodiment of this invention. Face plate 11*a* with the magnetic shunt 52 is used when a more sensitive receiver is required. Face plate 11*b* without the shunt is used when a receiver with an extended high frequency response is needed. The mounting of the two face plates 11*a* or 11*b* is identical and they may be substituted for each other. The magnetic field structure of the device comprises a pair of pole pieces 14 and 15, upon which the voice coils 16 and 17 are wound, and a permanent magnet 18 of the bar type. The voice coils 16 and 17 are connected in series, and the remaining two ends of the windings are brought out and connected to the connecting terminals of the device which comprise the conductive housing 10 and a U-shaped contact member 27 having its legs straddling the magnet member 18 and secured to the housing 10 by rivets 30, and is insulated from the housing 10 by insulating washers 31. In order to prevent alternating flux developed during operation of the device from linking with the housing 10, there is provided within the housing an auxiliary flux path extending between the pole pieces. This auxiliary flux path comprises projections of pole pieces 14 and 15 formed integrally with the pole pieces, and extending toward each other. The adjacent ends of these projections of the pole pieces 14 and 15 are separated by the air gap 33 which is so proportioned that the magnet bar 18 is not effectively short-circuited and a substantial amount of the steady state flux produced by the magnet 18 is caused to traverse the diaphragm 13. To further concentrate the flux and increase the amount traversing the diaphragm 13 a plate 11*a* of magnetically permeable metal is mounted adjacent to the diaphragm and in contact with it at their perimeters. From its perimeter it rises radially toward the center and away from diaphragm for a short distance forming a conical section. Then again as an inverted conical section nested within the outer conical section it drops toward the diaphragm to the flat central portion 52. This central portion 52 which is depressed from the annular apex at the juncture of the two portions of the form of conical sections is parallel to the diaphragm and about 0.007 of an inch away from it. This portion 52 is circular and of a size such that it covers an area of the diaphragm 13 directly over the pole pieces 14 and 15. This placement of the portion 52 has a concentrating effect upon the lines of force emanating from the magnetic poles 14 and 15**. More of the lines of force are now caused to traverse the diaphragm, thereby increasing the receivers sensitivity.

In the portion of the disc 11*a* having the form of a conical section extending toward the diaphragm 13 are a number of holes 51 for permitting the sound waves to radiate away from the diaphragm. The number, size and position of these holes 51 is determined so that the volume of air displaced by the disc 11*a* in this chamber 21 does not greatly alter its resonance.

The plate 11*b* which may be used in place of 11*a* consists of only the first portion of the shape of a conical section of 11*a*. This is sufficient to clamp the members 23 and 24 between itself and the ring 43. The output of the receivers when using plate 11*b* is slightly lower in volume but the higher frequency response of the receiver is increased by about 1000 cycles to almost 5000 cycles.

The acoustic system comprises, in addition to the diaphragm 13, a damping plate assembly 39 comprising plates 40 and 45, an air chamber 19 between the diaphragm 13 and damping plate assembly 39, an air chamber 20 between the damping plate assembly 39 and housing 10, an air chamber 21 between the diaphragm 13 and the plastic membrane 24 in which chamber is located a cloth damping means 23, and an air chamber 22 between the plastic membrane 24 and the ear cap 8.

By the selection of a diaphragm of proper weight, it is possible to obtain one that has about a 4000 cycles per second harmonic multiple of the natural response frequency thus obtaining the boost in response, due to this multiple of the natural harmonic, within the useable range. To equalize the response within the desired band of frequencies requires that peaks in the response at the natural period of the diaphragm be compressed and the response in the valleys between the resonant peaks be reinforced.

For compressing the output peak due to the diaphragms resonance, a damping plate 39 cooperating with chambers 19 and 20 is utilized. The damping plate consists of an inner plate 40 having six openings 44 in it, and has mounted on it in spaced apart relation a flat annular ring 45. This construction defines a relatively long restricted passage 46 communicating between the chamber 19 and the chamber 20. The spacing of the members 40 and 45 is controlled by spacers 47 and rivets 48, and the size of the holes 44 are so proportioned that the resistance to the passage of air through the restricted passage 46 serves with the cooperation of the chambers 19 and 20 to effectively dampen the natural resonant vibration of the diaphragm 13. A more detailed explanation of the construction of this damping plate may be found in Patent 2,205,670.

The resonant air chamber 21 located between the diaphragm 13 and the plastic membrane 24, is so proportioned that it reinforces the vibration of the diaphragm in the range of frequencies in the vicinity of 3200 cycles. However, this sharply peaked resonant boost in the output would produce distortion, so this resonant peak, too, is flattened, but instead of using a metal damping plate, a cloth disc 23 is stretched across the chamber adjacent to the plastic membrane 24. This cloth is especially selected to be particularly effective in damping frequencies of the order of 3200 cycles. One such cloth that meets the requirements is a finished type cloth with a 250 thread count.

To further reinforce the movement of the diaphragm, the chamber 22 between the plastic membrane 13 and the earcap 8 is so proportioned that it, in cooperation with the holes 9 and an average ear, produces an increase in output over the useable frequency band.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a sound translating device, having pole pieces with means for varying the flux therein, and a diaphragm of magnetic material mounted adjacent but not in contact with the pole pieces and responsive to the variations of flux in said pole pieces, a magnetic shunt member of a shape similar to the diaphragm and with its edges mounted adjacent and in contact with the edges of the diaphragm, said member having a center portion spaced apart from the center of the diaphragm and forming a part of the magnetic circuit thereof, and a series of openings in said member around said center portion to increase the size of the chamber between the diaphragm and the member.

2. In a receiver for use in a telephone set, a magnetic diaphragm, a pair of pole pieces, a permanent magnet, means for mounting said permanent magnet and said pole pieces whereby said magnet maintains the poles of said pole pieces at predetermined levels and directions of polarity, means for mounting said magnetic diaphragm a predetermined distance from said pole pieces, an air chamber between said pole pieces and said diaphragm, a magnetic shunt, said shunt mounted on the side of the diaphragm opposite that which said pole pieces face, said shunt of such form that its edge is in contact with said diaphragm at said diaphragm's edge and its central portion is located away from said diaphragm and parallel to it, a front air chamber between said magnetic shunt and said magnetic diaphragm, said magnetic shunt having an annular portion between said central portion and said edge which is at a greater distance from the diaphragm than said central portion whereby said front chamber aids in increasing said diaphragm's response, and an air vent in said diaphragm to maintain equal pressures in said air chambers to thereby maintain the distance of said diaphragm from said pole pieces and from said magnetic shunt.

3. In a sound translating device, comprising a cup-shaped rear housing member, a diaphragm mounted within said housing, said diaphragm having a predetermined response characteristic over the operating frequency range with a natural frequency of about 1100 cycles per second when mounted within said housing for substantially free vibration, an inner plate, a plurality of restricted openings through said plate, said plate mounted within said housing and displaced from said diaphragm a predetermined distance to define a chamber adjacent the inner side of said diaphragm, a rear chamber formed by said plate and said housing member, said first chamber and said restricted openings cooperating with the rear chamber to flatten the response in the region of resonance of said diaphragm, means for increasing the sensitivity of response and for reducing excessive amplitudes of vibration of said diaphragm comprising a magnetically permeable member mounted in front of the diaphragm having a central disc shaped portion depressed so that this portion is close to and parallel with said diaphragm but not in contact with said diaphragm, while the edges of said member are in contact with said diaphragm's edges.

4. In a sound translating device comprising, a cup-shaped rear housing member, a magnetic field structure including pole pieces having windings thereon, a diaphragm mounted within said housing member, said diaphragm having a predetermined response characteristic to electrical voltages acting on said windings over the operating frequency range when mounted within said housing for substantially free vibration, an inner plate having a plurality of restricted openings mounted within said housing member and displaced from said diaphragm to define a chamber adjacent the inner side of said diaphragm to alter said diaphragm response, a perforated front housing member, a layer of cloth over the external surface of said front housing member, said cloth effective to decrease the output of said diaphragm at frequencies of the order of 3200 cycles per second.

5. In a sound translating device, a cup-shaped rear housing member, a magnetic field structure including pole pieces having windings thereon mounted in said member, a diaphragm mounted within said housing member, said diaphragm having a predetermined response characteristic to voltages acting on said windings when mounted within said housing for substantially free vibration, an inner plate with a plurality of restricted openings mounted within said housing member and displaced from said diaphragm to define a chamber adjacent the inner side of said diaphragm to alter said diaphragm's response, a perforated front housing member, a layer of cloth over the external surface of said front housing member, said cloth effective to decrease the output of said diaphragm at frequencies of the order of 3200 cycles per second, and a polyester film disc covering the external surface of said cloth to seal the interior of the device against the entry of dust and moisture.

6. In a sound translating device, a cup-shaped rear housing member, a magnetic field structure within said member including pole pieces having windings thereon, a diaphragm mounted within said rear housing member, said diaphragm having a predetermined response characteristic over the operating frequency range with a natural frequency of about 1100 cycles per second when mounted within said housing for substantially free vibration, an inner plate having a plurality of restricted openings through itself and mounted within said housing and displaced from said diaphragm a predetermined distance to define a first chamber adjacent the inner side of said diaphragm, a rear chamber formed by said plate and said rear housing member, said first chamber and said restricted openings cooperating with said rear chamber member to flatten the response in the region of said diaphragm's resonance, a magnetically permeable perforated front housing member so constructed that a portion of it is close to and parallel with said diaphragm to increase the sensitivity of said diaphragm, a layer of cloth over the external surface of said front housing member, said cloth effective to decrease the output at frequencies of the order of 3200 cycles per second, and a polyester film disc covering the external surface of said cloth to seal the interior of said device against the entry of dust and moisture.

7. In a sound translating device, a cup-shaped rear housing member, a magnetic field structure including pole pieces having windings thereon, a diaphragm mounted within said housing member, said diaphragm having a predetermined response characteristic when mounted upon said housing for substantially free vibration, an inner plate mounted within said rear housing member and displaced from said diaphragm to define a chamber adjacent the inner side of said diaphragm, said pole pieces projecting through said plate, a plurality of restricted passages in said plate, said chamber adjacent the inner side of said diaphragm and said restricted passages effective to damp said diaphragm at its natural resonant range, an air passageway in said diaphragm to permit the equalization of pressure at both of its sides, said passageway also effective to dampen said diaphragm's response at the lower frequencies, a magnetically permeable perforated front housing member, means for mounting said front housing member so that a portion of it is located a predetermined distance from and parallel with said diaphragm, a layer of cloth over the external surface of said front housing member, said cloth effective to decrease the peak of the resonant output at frequencies of the order of 3200 cycles per second, and a polyester film disc covering the external surface of said cloth to seal the interior of said device against the entry of dust and moisture.

8. In a sound translating device comprising a cup-shaped rear housing member, a magnetic field structure including pole pieces having windings thereon, a diaphragm mounted within said housing member, said diaphragm having a predetermined response characteristic when mounted within said housing for substantially free vibration, an inner plate mounted within said rear housing member and displaced from said diaphragm to define a chamber adjacent the inner side of said diaphragm, said pole pieces projecting through said plate, a plurality of restricted passages in said plate, said chamber adjacent the inner side of said diaphragm, said restricted passages and the chamber defined by the plate and rear housing member effective to decrease the response of said diaphragm at its natural resonant frequency, a front housing member, a front chamber defined by said diaphragm and said front housing member, said front chamber effective to reinforce the vibrations of the diaphragm at frequencies of about 3200 cycles, said front housing member having a plurality of perforations, said front housing member covered with a cloth disc, said cloth disc with said front housing perforations effective to damp the peaked response of said diaphragm due to the resonance of said front chamber.

9. A sound translating device comprising a cup-shaped rear housing member, a magnetic field structure including pole pieces having windings thereon, a diaphragm mounted within said housing member, said diaphragm having a predetermined response characteristic when mounted upon said housing for substantially free vibration, an inner plate mounted within said rear housing member and displaced from said diaphragm to define a chamber adjacent the inner side of said diaphragm, said pole pieces projecting through said plate, a plurality of restrictions in said plate, said chamber adjacent the inner side of said diaphragm, said restricted passages and the chamber defined by the plate and rear housing member effective to decrease the response of said diaphragm at its natural resonant frequency, a hole in said diaphragm to permit the equalization of pressure at both of its sides, said hole also effective to decrease said diaphragm's response at the lower frequencies, a magnetically permeable perforated front housing member so constructed that its central portion is close to and parallel with said diaphragm, a front chamber defined by said diaphragm and said front housing member, said front chamber effective to reinforce the vibrations of the diaphragm at frequencies of about 3200 cycles per second, a layer of cloth over the external surface of said front housing member, said cloth effective to decrease the peak of the resonant output at frequencies of the order of 3200 cycles per second, and a polyester film disc covering the external surface of said cloth to seal the interior of said device against the entry of dust and moisture.

References Cited in the file of this patent

UNITED STATES PATENTS

| | | |
|---|---|---|
| 1,943,425 | Eaton | Jan. 16, 1934 |
| 2,205,669 | Pye | June 25, 1940 |
| 2,249,158 | Morrison | July 15, 1941 |
| 2,522,266 | Hanson | Sept. 12, 1950 |

FOREIGN PATENTS

| | | |
|---|---|---|
| 425,186 | Great Britain | Mar. 8, 1935 |